May 26, 1936.  E. C. HARDY  2,042,308

FILTER

Filed Sept. 20, 1934  3 Sheets-Sheet 1

Inventor:
Elbert C. Hardy
By Fisher, Clapp, Soans & Pond Attys.

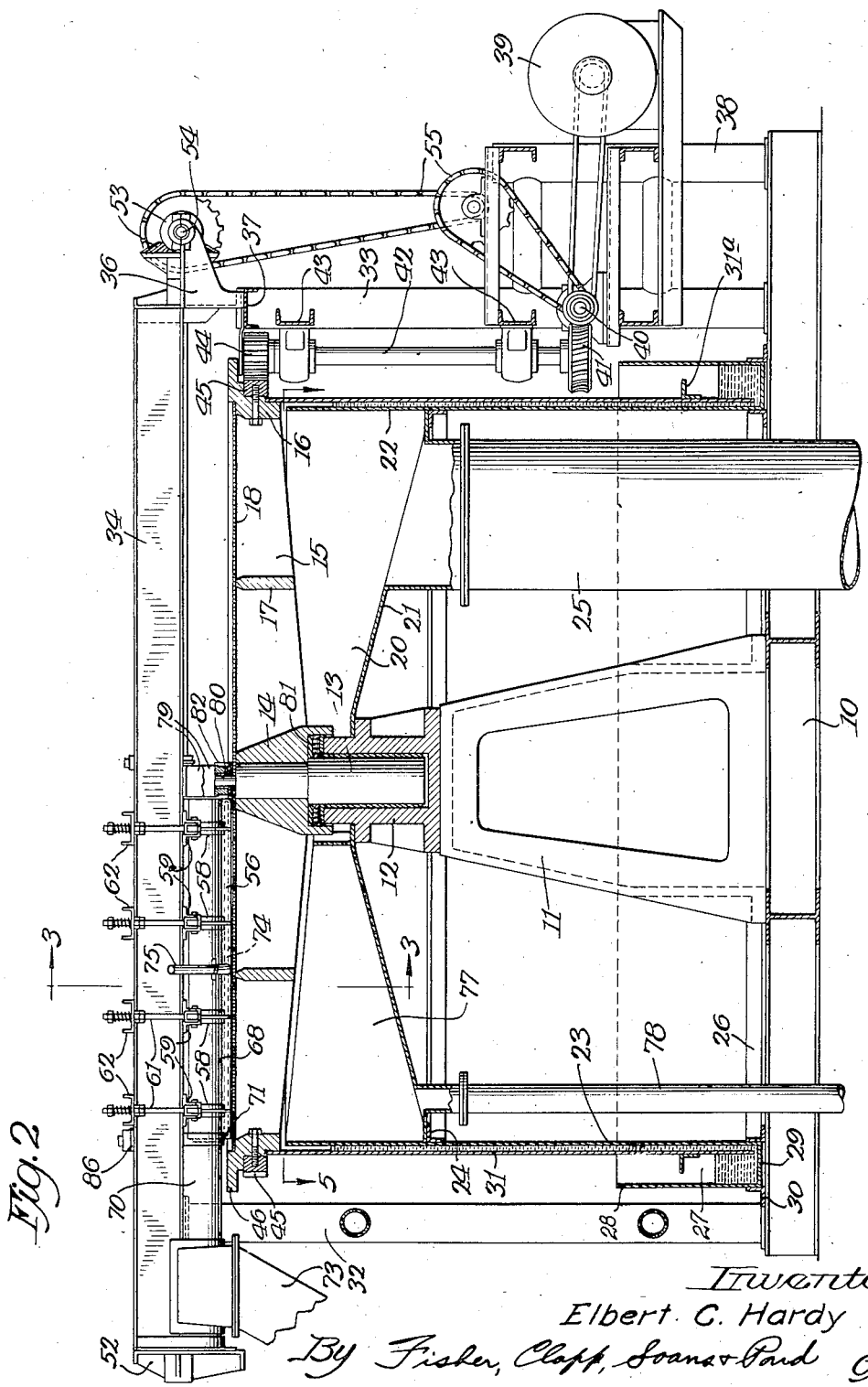

May 26, 1936.  E. C. HARDY  2,042,308
FILTER
Filed Sept. 20, 1934   3 Sheets-Sheet 3
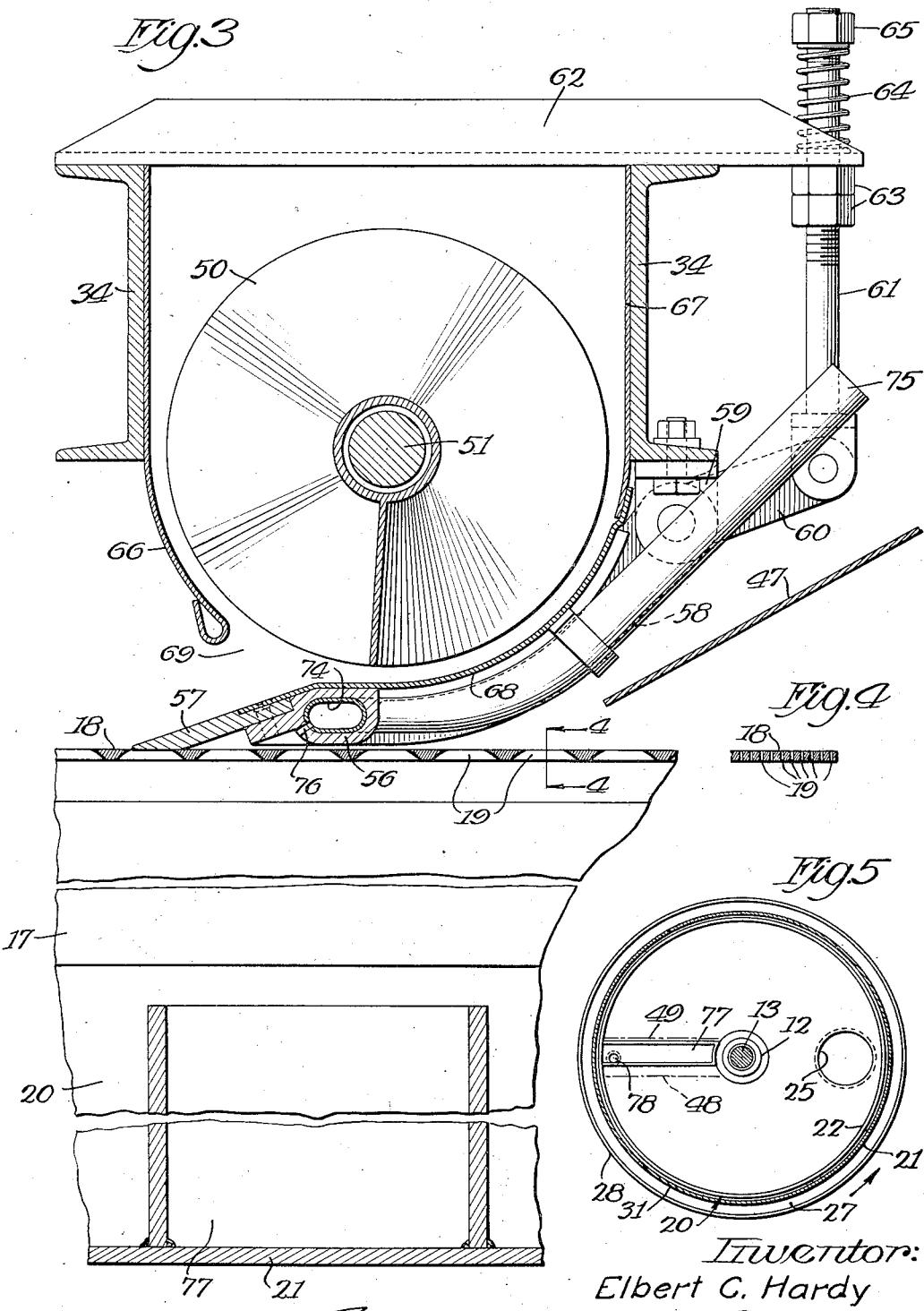
Inventor:
Elbert C. Hardy
By Fisher, Clapp, Soans & Pond  Attys.

Patented May 26, 1936

2,042,308

UNITED STATES PATENT OFFICE 2,042,308

FILTER

Elbert C. Hardy, Manistee, Mich., assignor to Morton Salt Company, Chicago, Ill., a corporation of Illinois Application September 20, 1934, Serial No. 744,765

7 Claims. (Cl. 210—196)

The invention relates to filters for separating liquids from granular material and more particularly to the type of filter employing a horizontal rotating filter screen and a pan or receptacle below the screen which is connected to a vacuum pump or like means for maintaining a partial vacuum below the screen.

The invention seeks to improve a filter of the type noted by providing sealing means to prevent the access of air into the necessary space or opening between the screen and the vacuum pan or receptacle. The invention further seeks to provide improved means for removing the solid material from the filtering screen, and also improved means for washing the screen.

The invention consists in the features hereinafter set forth, illustrated in the preferred form in the accompanying drawings and more particularly pointed out in the appended claims.

In the drawings:

Fig. 2 is a vertical section on the line 2—2 of Fig. 1.

Fig. 3 is a detail section taken on the line 3—3 of Fig. 2, and drawn on an enlarged scale.

Fig. 4 is a detail section on the line 4—4 of Fig. 3.

Fig. 5 is a detail section on a reduced scale taken on the line 5—5 of Fig. 2.

Figures 1, 1A:
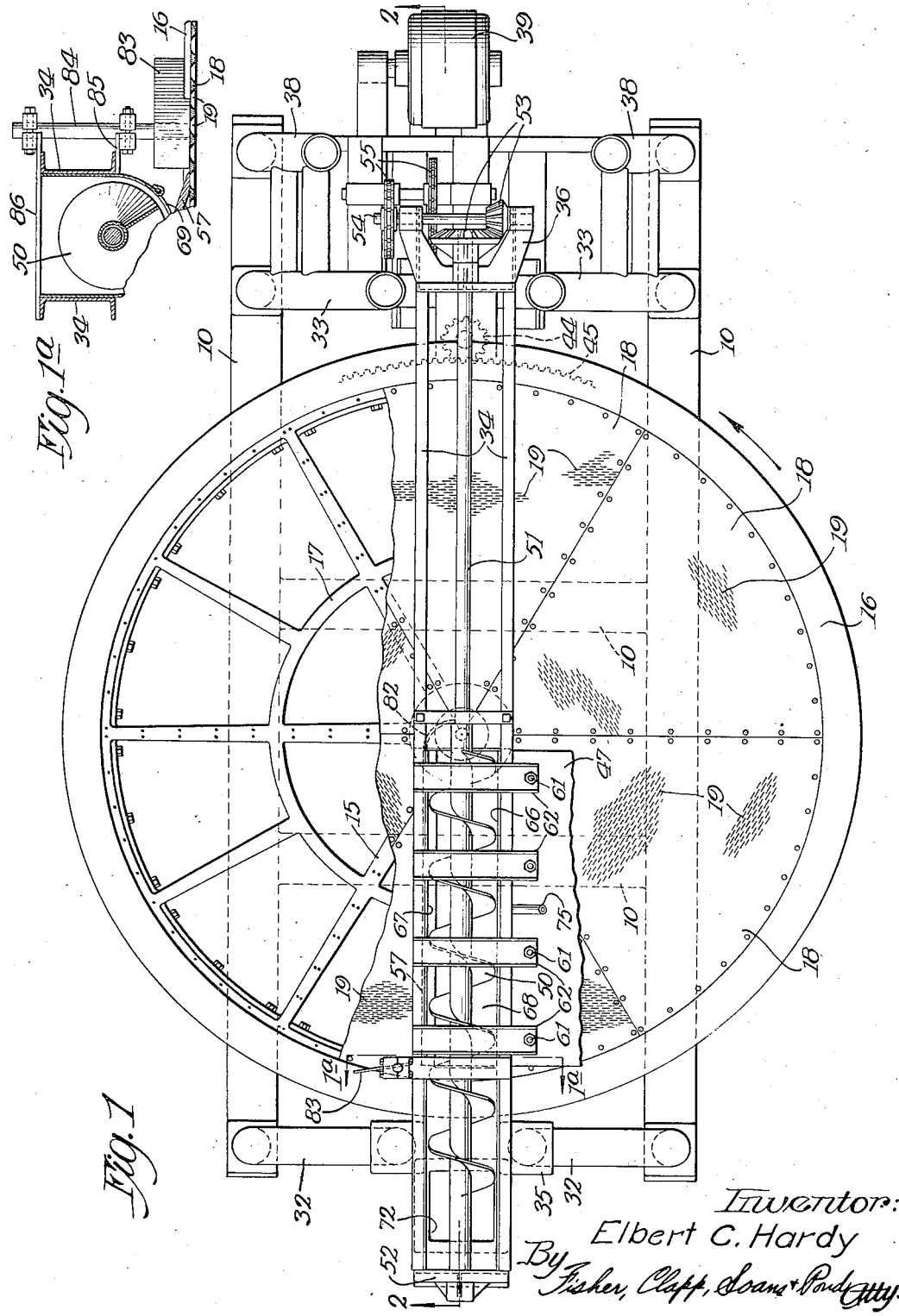
Fig. 1 is a plan view, with parts broken away, of the improved filter.
Fig. 1a is a detail section on the line 1a—1a of Fig. 1.

The apparatus is mounted upon a suitable base 10 formed of I-beams and supporting a central vertically disposed cast frame 11. A bearing block 12 on the upper end of the central frame 11 carries a short vertical heavy shaft 13 to the upper portion of which is fixed the hub 14 of the screen supporting frame. This frame is circular in outline and comprises a series of radial arms 15 extending from the hub 14 to a rim 16 and connected by circular bracing ribs 17. The screen proper, in the form shown, is formed of a number of substantially triangular plates 18 suitably riveted or otherwise secured to the arms and rim of the supporting frame and provided, as shown, with narrow slits or openings 19.

Below the screen is disposed a vacuum pan or receptacle 20, the bottom wall 21 of which is preferably cone-shaped and is centrally connected to a flange on the bearing block 12. At its outer edge, the bottom wall 21 of the vacuum pan or receptacle is connected to a vertical cylindrical wall 22 which forms the side wall of the vacuum pan or receptacle and has a portion 23 extending a considerable distance below the bottom of the pan. The joints of the bottom wall 21 with the side wall 22 and with the central block 12 are made air-tight and the joint between the bottom wall and the vertical cylindrical wall is preferably reinforced by a circular angle bar 24. The bottom of the vacuum pan or receptacle is also connected by a pipe 25 to a vacuum pump so that a partial vacuum may be maintained below the filtering screen or table.

At its lower edge, the depending portion 23 of the cylindrical wall of the vucuum pan is connected to a circular angle bar 26 which rests upon the base beams 10.

The lower portion of the wall 23 is surrounded by an annular trough 27 formed between the wall 23 and a short cylindrical wall 28 surrounding and spaced from the wall 23 and a bottom wall 29. A circular angle bar 30 mounted on the base beams 10 surrounds and is secured to the lower edge of the wall 28. Secured to and depending from the rim 16 of the frame for the filtering screen is a cylindrical skirt 31 connected to the rim by an air-tight joint and disposed about and closely adjacent the cylindrical wall 22—23 of the stationary vacuum pan or receptacle. The lower edge of the skirt 31 extends down into the trough 27 to a point closely adjacent its bottom. Suitable sealing liquid, such as water or oil, in the trough prevents access of air through the space between the walls 23 and 31 and into the space between the filtering screen and vacuum pan. Hence, all air drawn into this space must pass through the screen and the material thereon to be filtered. Obviously, in operation, the liquid in the trough will rise in the space between the walls 23 and 31 to a considerable height as indicated in Fig. 2, in accordance with the extent of vacuum maintained below the filtering screen, and the height of the walls 22—23 and 31 is proportioned in accordance with the desired amount of vacuum to be maintained beneath the screen. The wall 31 is preferably equipped near its lower end with a stiffening angle bar 31'.

Upright frames are mounted on each end of the longitudinal base beams 10. These frames comprise pairs of upwardly and inwardly inclined columns 32 and 33 and carry a pair of horizontal channel bars 34 which extend over and are spaced somewhat above the filtering screen or table. The channel bars 34 at one end are mounted on cap pieces 35 on the upper ends of the columns 32 and at their opposite end are fixed to a bracket 36 mounted on a channel bar 37 extending between the upper ends of the columns 33.

The lower portions of the columns 33 and a pair of short columns 38 are connected together by longitudinal and transverse bars and form a frame for supporting the drive mechanism. A motor 39 on this frame, through a belt and pulley drive, operates a horizontal countershaft 40 and the latter is connected by worm gearing 41 to a vertical shaft 42. The latter is mounted in bearings fixed to cross bars 43 extending between the columns 33. At its upper end the shaft 42 is provided with a pinion 44 which engages the teeth of a circular rack 45 which is secured within a rabbet or recess in the rim 16 of the filtering table. Preferably, as shown, the upper portion of the rim forms a flange 46 which projects over and beyond and thus protects the teeth of the rack 45.

The filtering table is revolved slowly and the mixed granular material and liquid are delivered to its surface by a feed board or chute 47 along a substantially radial line as indicated at 48 in Fig. 5. The material is thus deposited in a layer upon the upper surface of the screen and the liquid is withdrawn therefrom into the vacuum pan or receptacle and delivered through the pipe 25. The filtering operation is continuous and the filtering bed or table rotates in the direction of the arrows indicated in Figs. 1 and 5. The wet material, as stated, is fed on to the screen along the line 48 and the filter cake is withdrawn therefrom by a suitable scraper located along a line indicated at 49 in Fig. 5, the material gathered up by the scraper being delivered by a suitable screw conveyer.

The screw conveyer 50 is disposed above and on one side of the center of the filtering table and lies partly below the pair of channel bars 34 as shown in Fig. 3. It is mounted on a horizontal shaft 51 journaled at one end in the casting 36 and at its opposite end in a bearing block 52 fixed to the ends of the channel bars 34. At its right hand end the conveyer shaft 51 is connected by a pair of beveled gears 53 to a short horizontal shaft 54, and the latter is connected by reducing chain and sprocket gearing 55 to the countershaft 40.

The dry material is delivered to the conveyer by a scraper which comprises a bar 56 (see Fig. 3), preferably formed of cast bronze and upon which is mounted a scraper blade 57 formed of micarda, hard rubber or other like compounded material. Bar 56 has a series of curved extensions or arms 58 which are pivoted to a series of brackets 59 mounted on the lower flange of one of the channel bars 34. Short arms 60 projecting from the extensions 58 are pivoted to the lower ends of a series of adjusting bolts 61 which extend through openings in a series of short channel bars 62 which extend over and are fixed to the upper flanges of the bars 34. Adjusting nuts 63 on the bolts 61 engage the lower faces of the bars 62 and coil springs 64 surround the upper ends of the bolts 61 and extend between the nuts 65 on the bolts and the upper faces of the bars 62. By the means described the scraper bar which extends between the center and periphery of the filter disk is adjustably and yieldingly held in position in engagement with the surface of the filtering screen.

Throughout the length of the scraper the casing for the screw conveyer comprises two plates 66 and 67 fixed respectively to the inner faces of the channel bars 34 and a curved bottom plate or apron 68 which is fixed to the arms or extensions 58 of the scraper bar and is adjustably and yieldingly held in position therewith. As shown in Fig. 3, the upper edge of the apron 68 overlaps the lower edge of the plate 67, but the adjacent edges of the plate 66 and apron 68 are spaced apart to provide an opening 69 through which the filter cake passes into the conveyer casing as it is removed by the scraper from the surface of the filtering screen. Beyond the outer end of the scraper blade, the conveyer casing is formed of a continuous U-shaped plate 70 having an end flange 71 which overlaps the outer end of the apron 68 as indicated in Fig. 2, and an opening 72 (see Fig. 1) in the extreme outer end of the conveyer casing communicates with a pipe 73 (see Fig. 2) through which the filter cake is discharged.

Between the points where the filter cake is removed from the screen and the wet material is delivered on to it, it is desirable to wash the surface of the screen. For this purpose a spray pipe is provided. In the form shown, a pipe 74 (see Fig. 3) is cast in the scraper bar and is connected to a supply pipe 75 and is arranged to deliver wash water to the surface of the screen through a series of bottom apertures 76 extending substantially throughout the length of the scraper bar. To prevent the wash water from contaminating the filtrate, the vacuum pan or receptacle is provided with a separate narrow radial compartment 77 below the spray pipe formed as indicated in Figs. 2, 3 and 5, by vertical walls fixed to the bottom wall of the vacuum pan. This compartment is connected to the pump or other source of vacuum or directly to waste by a pipe 78. The improved filter is particularly intended and adapted for filtering a mixture of salt crystals and brine as it is removed from the evaporator. With the arrangement shown the water which washes the screen to maintain the slits therein open will not be mixed with and dilute the brine which is withdrawn from the salt crystals.

The scraper blade is so located that there is some pressure exerted to force it toward the center of the screen. Because of this the inner end of the scraper is arranged to engage the lower portion of a bracket 79 which is fixed to and depends from the channel bars 34. This bracket is also provided with a bushing and bearing to receive a pintle 80 on the upper end of the shaft 13. A suitable thrust bearing 81 provided with rollers, is preferably interposed between the hub 14 of the screen frame and the bearing block 12.

As an aid in delivering the material to the inner end of the scraper blade, the bearing of bracket 79 is preferably provided with a curved flange 82 (shown in dotted lines in Fig. 1), the lower edge of which is disposed closely adjacent the upper surface of the screen.

The edges of the screen plates 18 are disposed within a rabbet or recess in the rim 16 of the screen frame and the vertical wall of this recess projects to some extent above the surface of the screen. As an aid in delivering the dry material or salt to the outer edge of the scraper blade, a vertically disposed plate or scraper 83 (Fig. 1a) is arranged to overlap the upper face and short vertical wall of the rim 16, and this plate 83 is fixed to the lower end of a short shaft 84 which is adjustably clamped to a pair of plates 85 and 86 fixed to the channel bars 34.

Obviously, changes may be made in the details set forth without departure from the scope of the invention as defined in the appended claims.

I claim as my invention:

1. A filter comprising a horizontal rotating filter screen, means for delivering material to be filtered onto the screen, a scraper for removing filter cake pivotally mounted for movement toward and from the screen, adjustable means for holding the scraper in position relatively to the screen, a screw conveyor to which the filter cake is delivered by the scraper, and a sectional conveyor casing for said conveyor, a section of the conveyor casing being mounted on the scraper.

2. A filter comprising a horizontal rotating filter screen, means for delivering material to be filtered onto the screen, a scraper for removing filter cake pivotally mounted for adjustment toward and from the screen, adjustable spring actuated means holding the scraper in position relatively to the screen, and a screw conveyor having a casing comprising lapped upper and lower sections for receiving the filter cake from the scraper, the lower section of the conveyor casing being mounted on the scraper.

3. A filter comprising a horizontal, circular, rotating screen, means for delivering material to be screened thereto, a substantially radial scraper for removing filter cake from the screen, and stationary deflectors located adjacent to the central and peripheral portions respectively of the screen for directing the filter cake toward the end portions of the scraper.

4. In a filter, the combination with a horizontal rotating screen, and a screw conveyor journaled above and radially of said screen, of a scraper underlying said conveyor parallel with the axis of the latter, an overhead support, rearwardly extending arms on said scraper pivoted to said support, and spring-actuated means acting through said arms to hold said scraper in contact with said screen.

5. In a filter, the combination with a horizontal rotating screen, and a screw conveyor journaled above and radially of said screen, of a scraper underlying said conveyor parallel with the axis of the latter, an overhead support, rearwardly extending arms on said scraper pivoted to said support, an apron overlying and secured to said scraper and scraper arms and at its upper end overlapping a side wall of said conveyor casing and forming a flexible extension of said wall, and spring-actuated means acting through said arms to hold said scraper in contact with said screen.

6. In a filter, the combination with a horizontal rotating screen, and a screw conveyor journaled above and radially of said screen, of a scraper underlying said conveyor parallel with the axis of the latter, said scraper having a hollow portion with an apertured bottom wall, and a wash water supply pipe communicating with said hollow portion.

7. In a vacuum filter the combination with a horizontal rotating screen, a vacuum pan underlying said screen formed with separate compartments for respectively receiving filtrate and wash water, and a screw conveyor journaled above and radially of said screen, of a scraper underlying said conveyor parallel with the axis of the latter, said scraper having a hollow portion with an apertured bottom wall overlying said wash water receiving compartment, and a wash water supply pipe communicating with said hollow portion.

ELBERT C. HARDY.